J. G. FEJFAR.
HUSKER.
APPLICATION FILED JAN. 4, 1909.
1,029,055.
Patented June 11, 1912.
2 SHEETS—SHEET 1.
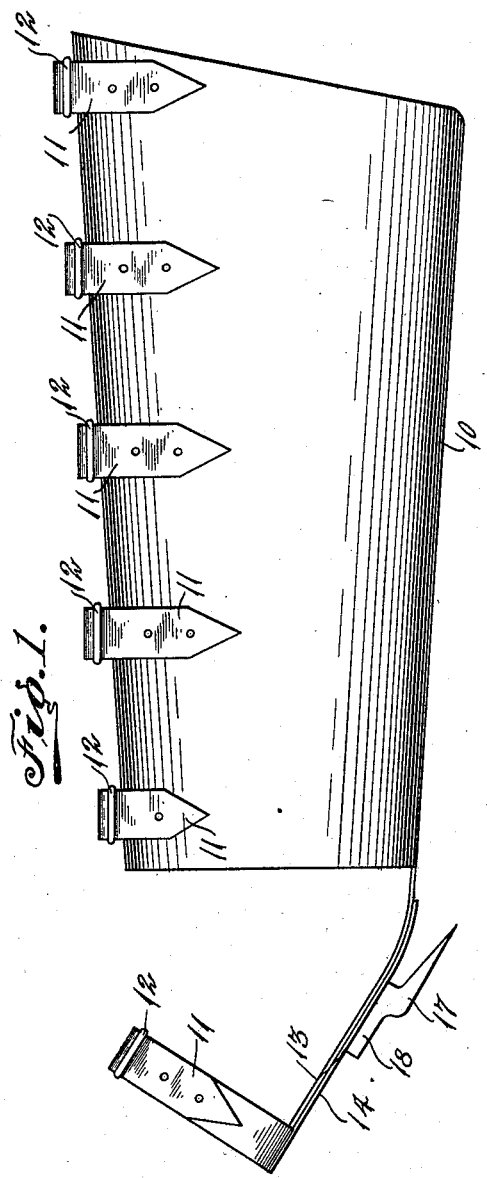
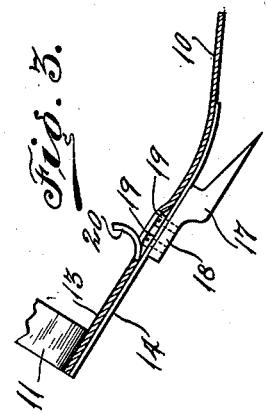
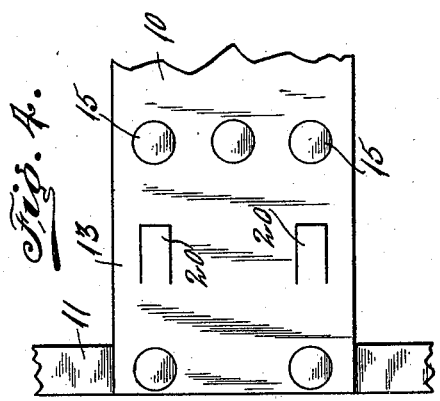
Witnesses
Jos Gregory
C. N. Woodward
Inventor
Joseph G. Fejfar.
By
Attorney J. G. FEJFAR.
HUSKER.
APPLICATION FILED JAN. 4, 1909.
1,029,055.
Patented June 11, 1912.
2 SHEETS—SHEET 2.
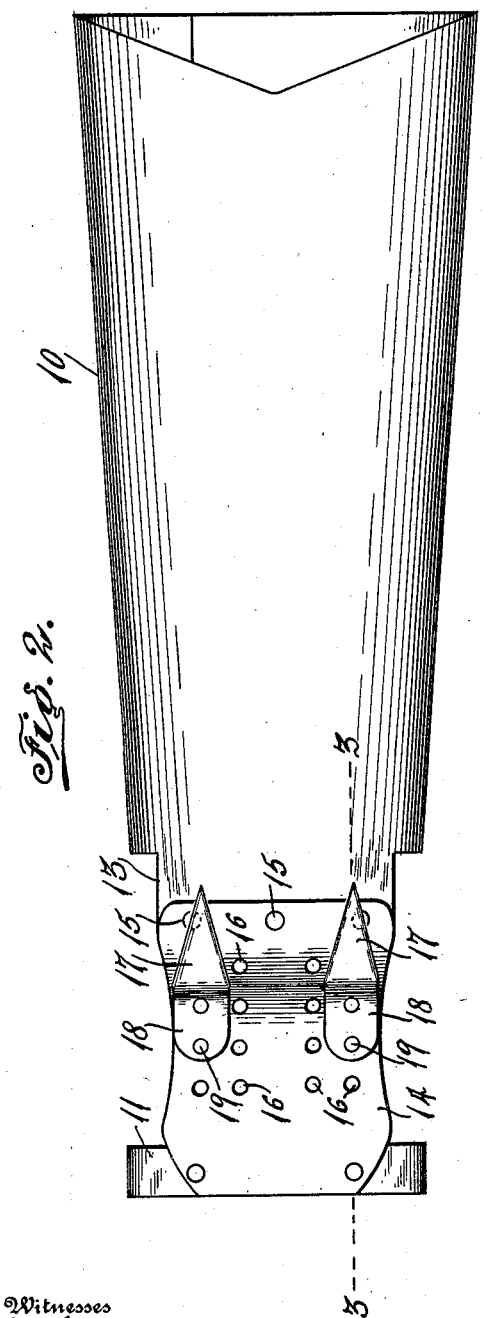
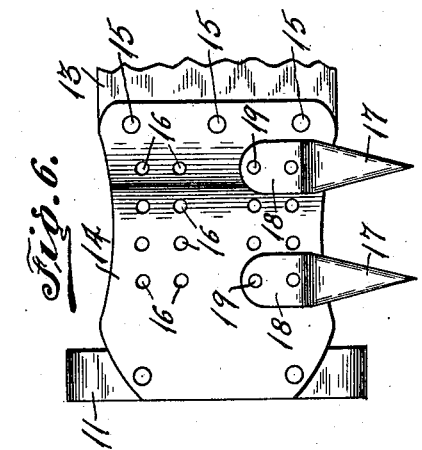
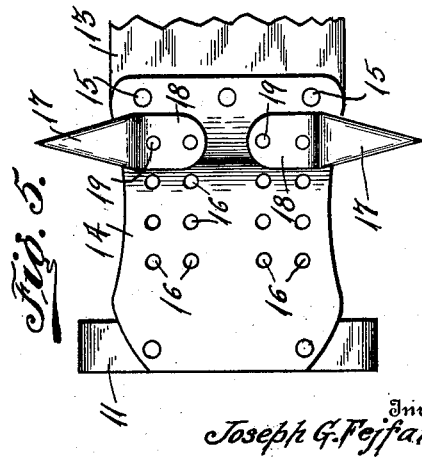
Witnesses
Jos Gregory.
C. N. Woodward
Inventor
Joseph G. Fejfar.
By
Attorney

UNITED STATES PATENT OFFICE.

JOSEPH G. FEJFAR, OF YANKTON, SOUTH DAKOTA.

HUSKER.

1,029,055.  Specification of Letters Patent.  Patented June 11, 1912.

Application filed January 4, 1909. Serial No. 470,627.

*To all whom it may concern:*

Be it known that I, JOSEPH G. FEJFAR, a citizen of the United States, residing at Yankton, in the county of Yankton, State of South Dakota, have invented certain new and useful Improvements in Huskers; and I do hereby declare the following to be a full, clear, and exact description of the invention, such as will enable others skilled in the art to which it appertains to make and use the same.

This invention relates to combined husking devices and wrist and arm protectors, and has for one of its objects to simplify and improve the construction and increase the efficiency and utility of devices of this character.

Another object of the invention is to provide a simply constructed device which may be adapted to the right or left hand wrist and arm of the operator without structural changes.

With these and other objects in view the invention consists in certain novel features of construction as hereafter shown and described and then specifically pointed out in the claim, and in the drawings illustrative of the preferred embodiment of the invention, Figure 1 is a side elevation of the improved device. Fig. 2 is a bottom plan view of the same. Fig. 3 is a section on the line 3—3 of Fig. 2. Fig. 4 is a view of the inner portion of the outer end of the device. Figs. 5 and 6 are views similar to Fig. 2, illustrating modifications in the arrangement of the husking pins.

The improved device comprises a flexible sleeve member 10, preferably of leather and adapted to be worn around the forearm and wrist of the wearer, and provided with a plurality of straps 11 having suitable buckles 12 at one end, to enable the member 10 to be attached to the arm and around the wrist, as will be obvious. The sleeve member 10 will be preferably decreased in width toward one end and with a reduced extension 13 extending from the smaller end. The member 10 is thus formed to closely fit the forearm and wrist of the operator, and by means of the straps 11 may be adapted to different sized persons, as will be obvious. Attached to the projecting portion 13 of the member 10 is a metal base plate 14, preferably riveted as at 15 to the extension 13, and provided with a plurality of apertures 16. The plate 14 is formed with the portion nearest to the sleeve member 10 curved, while the remaining portion of the plate is straight or flat, the curved portion confined to a relatively small part of the plate, the object thereof to be hereafter explained.

The apertures 16 are arranged in two rows near the edges of the plate and preferably within the straight portion thereof, as shown. The apertures are spaced at uniform distances apart, as shown. Bearing upon the plate 14 are spurs 17 having lateral offsets 18, the offsets provided with spaced threaded apertures corresponding to the apertures 16 of the plate, whereby the spurs may be detachably coupled to the plate by means of clamp screws 19 inserted through the apertures 16 and into the threaded apertures. The apertures 16 are spaced the same distance apart, so that the spurs may be adjustably coupled to the plate 14, as will be obvious. The inner surfaces of the spurs 17 are arranged obliquely to the longitudinal planes of the offset portions 18 so that when the spurs are coupled to the plate the free ends of the spurs will be located at a considerable distance from the free ends of the curved portion of the plate, as shown. By this means the points of the spurs are constantly spaced from the terminal of the curved portion of the plate, while the latter is adapted to bear against the palm of the hand of the operator. By this means when the operator bends his wrist outwardly, he throws the points of the spurs inwardly or away from the wrist and away from the body of the member 10, in position to more readily engage the husks and when the wrist is bent in the opposite direction and the palm of the hand bent as in the act of closing, the pressure exerted on the outer end of the shield will, by virtue of the space between the inner end of the shield and member 10, move the spurs longitudinally of the sleeve member 10, whereby the spurs may be more accurately positioned on the proper spot of the husk than if the operator were compelled to move his fore-arm and detach them from the ears of the corn, while at the same time the wrist and arm of the operator are protected by the curved portion of the plate and likewise by the flexible member 10. This form of the plate 10 with a small portion only curved is an important feature of the invention, and adds materially to its value and efficiency, as the points of the spurs are thereby located at a relatively greater distance from the adjacent terminal of the plate, so that the husks are more readily engaged by the spurs, as will be obvious. By providing a plurality of the apertures 16 the spurs may be adjusted as required to adapt the device to hands and wrists of different sizes, or to husks of varying conditions.

Formed in the projecting portion 13 of the member 10 are U-shaped clefts whereby tongues 20 are released, the clefts being so placed that when the tongues are turned inwardly the heads of the clamp screws will be exposed, so that they may be inserted or detached by a screw driver or other implement, as will be obvious. This is an important feature of the invention and also adds materially to its efficiency and utility. The plate 10 will preferably be of soft metal, such as untempered steel, while the spurs will preferably be of tempered steel.

In Fig. 5 the husking pins 17—18 are arranged to project in opposite directions from the plate 14, and in Fig. 6 the husking pins are both shown projecting laterally from the same side of the plate. By this illustration it is shown that the husking pins may be adjusted or arranged to project in any required direction from the plate 14, as the manner of placing the apertures 16 enables this to be readily done as required. By this means the utility and efficiency of the implement are materially increased.

What is claimed, is:—

The herein described husking implement comprising an attaching member, and inclined extensions formed thereon to engage the palm of the hand of the wearer, said extensions being provided with U-shaped clefts producing slots and tongues located therein, a supporting plate secured to said extension, husking means provided thereon, fastening means retaining the husking means against displacement, said fastening means being disposed in the slots and the said tongues adapted to contact with the opposite edges of the slots for concealing the said fastening means and preventing injury to the hand of the wearer.

In testimony whereof, I affix my signature, in presence of two witnesses.

JOSEPH G. FEJFAR.

Witnesses:
R. F. PETERKA,
JOSEPH FEJFAR.

Copies of this patent may be obtained for five cents each, by addressing the "Commissioner of Patents, Washington, D. C."